United States Patent [19]

Das et al.

[11] Patent Number: 5,189,697
[45] Date of Patent: Feb. 23, 1993

[54] LINE INTERFACE CIRCUIT

[75] Inventors: Tapan K. Das; Oguz Ozkan, both of Brampton; George S. Fung, Concord, all of Canada

[73] Assignee: Northern Telecom Limited, Montreal, Canada

[21] Appl. No.: 516,596

[22] Filed: Apr. 30, 1990

[51] Int. Cl.$^5$ .................... H02H 3/20; H04M 19/00
[52] U.S. Cl. .................... 379/413; 379/399; 379/345; 379/404
[58] Field of Search .............. 379/413, 387, 399, 412, 379/402, 403, 404, 345

[56] References Cited

U.S. PATENT DOCUMENTS

| | | | |
|---|---|---|---|
| 3,558,830 | 1/1971 | Bender | 379/412 X |
| 4,103,112 | 7/1978 | Korsky | 379/378 |
| 4,110,570 | 8/1978 | Foster | 379/412 X |
| 4,159,500 | 6/1979 | Baumbach et al. | 379/412 X |
| 4,203,009 | 5/1980 | Tattersall | 379/399 |
| 4,406,929 | 9/1983 | Pace et al. | 379/402 |
| 4,410,766 | 10/1983 | Beirne | 379/377 |
| 4,484,032 | 11/1984 | Rosenbaum | 379/345 |
| 4,514,595 | 4/1985 | Rosenbaum et al. | 379/385 |
| 4,633,038 | 12/1986 | Zarzig | 379/412 X |
| 4,661,979 | 4/1987 | Jakab | 379/412 |
| 4,709,296 | 11/1987 | Hung et al. | 379/412 X |
| 4,718,084 | 1/1988 | Dragotin | 379/412 |
| 4,829,567 | 5/1989 | Moisin | 379/413 |
| 4,862,309 | 8/1989 | Tajo et al. | 379/412 X |
| 4,876,620 | 10/1989 | Borkowicz | 379/412 X |
| 4,947,427 | 8/1990 | Rosch et al. | 379/412 |
| 4,982,422 | 1/1991 | Itoh et al. | 379/413 X |

Primary Examiner—James L. Dwyer
Assistant Examiner—M. Shehata
Attorney, Agent, or Firm—J. E. Moorhouse

[57] ABSTRACT

A line interface circuit supplies energizing direct current from a power source via tip and ring leads of a two wire communications line connected with a telephone apparatus, and also couples alternating current signals between the telephone line and an associated telephone facility. The line interface circuit is provided with tip and ring terminals for connection to the tip and ring leads, and power terminals for connection to the power source. Coupling circuitry is connected in series with the tip and ring terminals for providing paths for the energizing direct current and for the alternating current signals. An active tip feed circuit is connected in series between the tip terminal and the coupling circuitry for providing a tip feed path having a predetermined resistance while the telephone apparatus is in an OFF HOOK state and having a much higher resistance in response to an excess of voltage at the tip terminal. An active ring feed circuit is connected in series between the ring terminal and the coupling circuitry for providing a ring feed path having a predetermined resistance while the telephone apparatus is in the OFF HOOK state and having a much higher resistance in response to an excess of voltage at the ring terminal.

7 Claims, 2 Drawing Sheets

1

LINE INTERFACE CIRCUIT

INTRODUCTION

The invention is in the field of telephony and more particularly relates to interface circuits for supplying energizing current from a power source for operation of a telephone set, via a telephone line, and for coupling signals between the telephone line and a telephone facility.

BACKGROUND OF THE INVENTION

One of the major expenses in a telephone system is that of providing a line interface circuit for connecting each and every telephone line at a central office switching facility, or at a private branch exchange facility. In any practical telephone system, the line interface circuits are desirably inexpensive and essentially electrically robust. During those times when a telephone set is in use, the associated telephone line interface circuit provides an energizing direct current for the telephone set, via tip and ring leads of the telephone line. When the telephone set is in use, it is usually referred to as being OFF HOOK, and when the telephone set is not in use, it is referred to as being ON HOOK. The line interface circuit is also required to provide indication as to the telephone set being ON HOOK or OFF HOOK.

In a central office, each telephone line is typically routed from an outside environment toward a switching facility via a main distributing frame (MDF). The MDF is a convenient place to provide protection from high voltage and current transient energies, as are from time to time conducted by one or more of the telephone lines as the result of a utility power line cross or a lightning strike. Protection is usually provided by the well known means of gas tubes which are arranged to conduct currents associated with potentials in excess of a thousand volts to a heavy ground bus bar. Tip and ring leads of each telephone line extend from the MDF to one of the line interface circuits.

Each line interface circuit is provided by circuit board mounted components which includes tip and ring terminals for connection to a telephone line and power terminals for connection to a source for the energizing current, usually a central battery supply. The central battery supply is continually charged to a predetermined voltage by a battery charging apparatus, provided for that purpose. The battery charging apparatus is operated from utility power, but in the event of an interruption of the utility power the central battery supply is intended to continue to supply operating current for a limited time.

One example of a line interface circuit is disclosed in the U.S. Pat. No. 4,103,112 issued on Jul. 25, 1978 to V. V. Korsky, and titled "Telephone Line Circuit With Differential Loop Current Sensing And Compensation". A telephone line is terminated via the tip and ring terminals by tip and ring windings of a miniature transformer. Energizing direct current is conducted by 200 ohm tip and ring feed resistors connected in series between the battery supply and the tip and ring windings. In this example the feed resistors are used as a means for accurately determining the amount of direct energizing current being conducted via the transformer windings and the telephone line so that flux compensation can prevent the core of the transformer from saturating. Thus the transformer couples communications signals while being a barrier to substantially reduce coupling of high energy transient signals as may result from a lightning strike or a utility power line cross. Nevertheless secondary and compensating windings of the transformer are coupled with protection networks to further reduce exposure of onfollowing circuitry to such transient signals. The feed resistors are exposed to the full brunt of any transient signals, and are therefore usually carried on a separate substrate which is thermally isolated from the other line circuit components. The feed resistors are ideally arranged to either withstand transient signal occurrences or decisively fail in the event of such an occurrence, so the maintenance of line circuit functionality will not be plagued by marginal performance problems.

U.S. Pat. Nos. 4,484,032 and 4,514,595 issued on Nov. 20, 1984 and Apr. 30, 1985 to S. Rosenbaum et al, teach an "Active Impedance Transformer Assisted Line Feed Circuit" and "Active Impedance Line Feed Circuit". One of the functions of these line interface circuits is that of providing a required terminating impedance via active circuit apparatus. Particularly, tip and ring amplifiers are controlled in response to direct loop current and alternating differential current signals detected across tip and ring feed resistors, to generate the terminating impedance and to inject alternating current signals for transmission via the telephone line to the telephone set. In the second example, the expense of a transformer is eliminated. In the first example, a function of the transformer is not intended to include a reduction of transient energies. In both examples, this function is typically provided by a pair of diodes connected between the power terminals and each of the tip and ring terminals so that any transient energies traversing the tip and ring leads from the MDF are diverted to the power terminals.

As the line currents detected are used as indication of alternating current signals in the telephone line and indication of direct energizing current, the performance of the line interface circuit is contingent upon the values of the feed resistors being very closely matched. The operating characteristics are compromised in proportion to the tip and ring feed resistors becoming mismatched. Such mismatch may occur during the normal use of a line interface circuit, as one of the tip and ring feed resistors may age in response to unusual stress, as may be caused by transient electrical events such as a power line cross or a lightning strike, in association with the telephone line, in spite of the diode protection at the tip and ring terminals.

In some instances other circuits in the typical electronic telephone switching office have been found to be at risk of failure particularly in the event of a wide spread transient electrical event. A nearby lightning strike upon a telephone cable, may simultaneously affect a multitude of telephone lines terminated in the switching office. In such an instance, a corresponding multitude of diode networks each couples a spike of current via the power terminals. These simultaneous current spikes are additive along a main power bus in the switching system and may cause a damaging transient variation of voltages on power and ground buses in parts of the switching facility.

It is one object of the invention to provide a line interface circuit with tip and ring feed paths which maintain preferred operating resistances in spite of transient electrical events which could be expected to adversely affect the normal operating performance of the line interface circuit.

It is also an object of the invention to provide line interface circuits which are electrically robust and provide substantial isolation of power and ground buses from transient electrical events in a telephone system.

SUMMARY OF THE INVENTION

In an operating telephone system, a line interface is used for coupling alternating current signals, between a telephone facility and a telephone apparatus, connected via tip and ring leads of a telephone line. The telephone line and the telephone apparatus are energized by direct current supplied from a power source via tip and ring terminals being connected to the tip and ring leads. In the line interface, a method for supplying the direct current comprises the steps of valving a current flow in one direction between the power source and the tip terminal with a resistance of a preferred value, and substantially shutting OFF the current flow, in response to an occurrence of an excess voltage at the tip terminal; and valving a current flow in an opposite direction between the power source and the ring terminal with a resistance of a preferred value, and substantially shutting OFF the current flow, in response to an occurrence of the excess voltage at the ring terminal.

A line interface circuit, for supplying energizing direct current from a power source via tip and ring leads of a two wire communications line connected with a telephone apparatus, and for coupling alternating current signals between the telephone line and an associated telephone facility, includes tip and ring terminals for connection to the tip and ring leads and power terminals for connection to the power source. A coupling means is connected in series with the tip and ring terminals for providing paths for the energizing direct current and for the alternating current signals. An active tip feed means is connected in series between the tip terminal and the coupling means, and an active ring feed means is connected in series between the ring terminal and the coupling means. The active tip feed means and the active ring feed means each including: a line terminal for connection at a respective one of the tip and ring terminals, and an interface terminal for connection to the coupling means; passive and active resistance elements being connected in series between the line and interface terminals, the passive resistance element being of a resistance value corresponding to a predetermined fraction of the predetermined resistance; a reference voltage divider connected between the line and interface terminals and defining a reference voltage tap; and valving control means being responsive to a reference voltage at the reference voltage tap, for adjusting the resistance of the active resistance element to a value which in summation with the resistance of the passive resistance element provides the predetermined resistance, and being responsive to an occurrence of an excess of voltage at the reference voltage tap, for adjusting the resistance of the active resistance element toward infinity, whereby current flow via the active feed means is substantially shut OFF.

BRIEF DESCRIPTION OF THE DRAWINGS

An example embodiment of a line interface circuit is discussed with reference to the accompanying drawings in which.

DESCRIPTION OF THE PREFERRED EMBODIMENT

Figure 1:
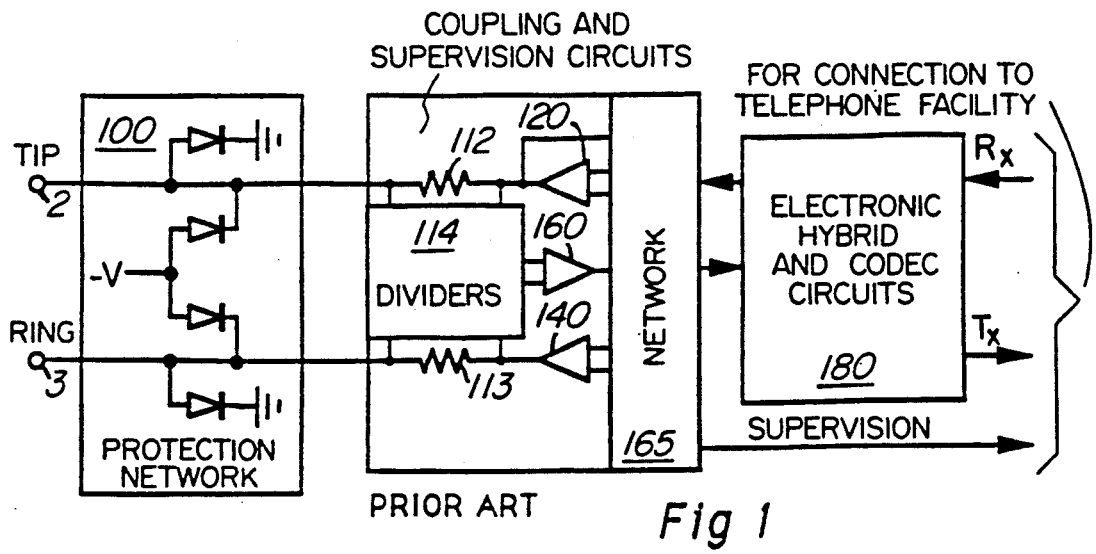
FIG. 1 is a block schematic diagram of a typical prior art line interface circuit which includes a diode protection network for routing currents associated with transient electrical events toward power and ground conductors, for purposes of protecting onfollowing circuits, such as signal coupling and supervision circuits and hybrid and codec circuits, from unusual potentials and currents, which might otherwise cause damage to such circuits.
Figure 2:
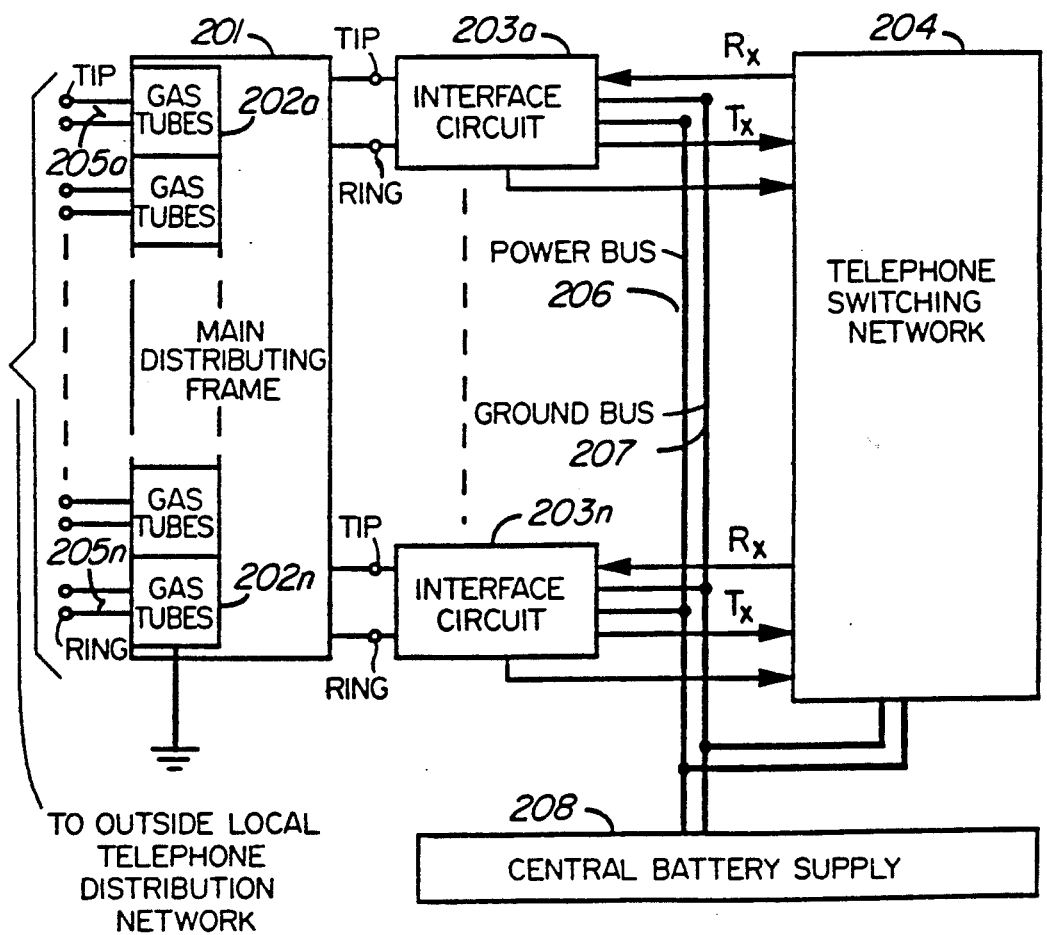
FIG. 2 is a block schematic diagram of a typical telephone central office wherein line interface circuits are used to complete communications paths between telephone lines and a telephone switching network.

A brief review of the prior art, as exemplified in FIG. 1 and as used in FIG. 2 is of benefit to an understanding of the essence and application of the invention. The prior art line interface circuit of FIG. 1 is of a general type disclosed in the previously mentioned patents to Rosenbaum et al. That is to say that tip and ring terminals are connected by tip and ring feed resistors 112 and 113 to a coupling and supervision circuit. The tip and ring terminals are driven by tip and ring amplifier circuits 120 and 140 which are responsive in operation to signals and biases from a network 165. When a telephone in an OFF HOOK condition is connected via a telephone line to tip and ring terminals 2 and 3 alternating current signals and direct energizing current are detected as voltages developed across tip and ring feed resistors 112 and 113. These voltages are coupled via voltage dividers 114 to an amplifier circuit 160 which drives into the network 165. The network 165 transmits signals to an electronic hybrid circuit indicated, and receives signals destined for the telephone, from the electronic hybrid circuit. Neither of the electronic hybrid circuit and a codec circuit, both indicated at 180, is shown in detail as both are well known. The hybrid and codec circuits cooperate in providing two wire four wire and analog and digital signal conversions in a well known manner, to provide communications via a telephone facility. The network 165 usually includes an impedance network, not shown, which determines effective output impedances of the tip and ring amplifiers 120 and 140, so that in combination with the values of the tip and ring feed resistor 112 and 113, a prescribed telephone line terminating impedance is in effect across the tip and ring terminals. Satisfactory operation of the line interface circuit relies upon the tip and ring feed resistors 112 and 113 being of closely matched resistance values, and for this reason the feed resistors are usually manufactured on an electrically insulating thermally conductive substrate and are individually trimmed to within 0.1% of a preferred resistance.

One of the problems with line interface circuits which use active components is that a transient electrical energy appearing at either of the tip or ring terminals can be of a destructive effect. If the transient electrical energy is of an extremely excessive all be it momentary potential, as typically results from a lightning strike upon the telephone line, various of the amplifiers may be destroyed. If the transient electrical energy is more in the nature of a prolonged excessive current as is typical of an accidental power line cross, it may be that one or both of the tip and ring feed resistors is sufficiently stressed to become mismatched. A diode protection network as illustrated at 100 provides the standard solution for these problems, particularly when combined with other protective apparatus as exemplified in FIG. 2. Line interface circuits 203a-n are installed in the central office in FIG. 2, between a main distributing frame (MDF) 201 and a telephone switching network 204. The MDF terminates each telephone line connected at the central office and provides a high voltage path for any transient electrical energy traversing the telephone line. Each path is typically provided by an individual gas tube device indicated at 202a-n, and which is connected to each lead of every telephone line 205a-205n. The gas tubes used for this purpose usually becomes very conductive when exposed to a potential difference from ground in excess of a thousand volts. Thus transient potentials in excess of a thousand volts are rarely ever transmitted to the tip terminal or to the ring terminal of a line interface circuit. However it has been found that a lightning strike which spreads energy over a multitude of the telephone lines may cause over voltage stress leading to failures of circuits not directly connected to affected telephone line interface circuits, but merely connected to a power bus 206 or a ground bus 207 common to many of the affected line interface circuits. The apparent cause of this effect is an additive effect of a multitude of simultaneously conducting diode protection networks. In spite of very low impedance characteristics of a central battery supply 208 to which the power and ground buses 206 and 207 are connected, the simultaneously conduction causes a momentary excursion of voltage on either of the power and ground buses which exposes a many circuits in the telephone switching network to stresses for which they were not designed.

Figure 3:
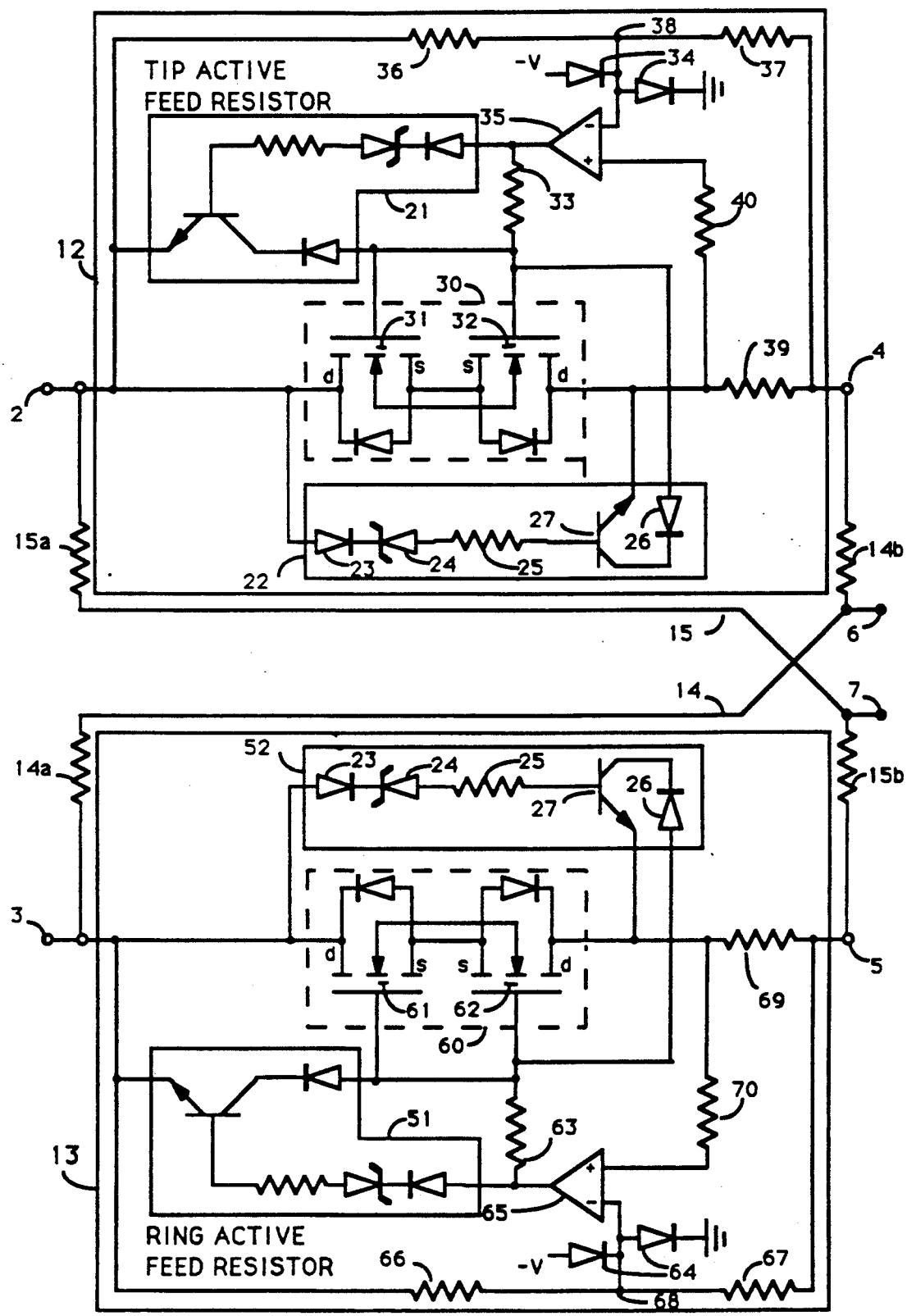
FIG. 3 is a schematic diagram of an active resistance line feed apparatus in accordance with the invention, for use in providing tip and ring feed resistor elements in a line interface circuit suitable for use in FIG. 2, and preferable without a diode protection network of the type or similar to the diode protection network illustrated in FIG. 1.

The embodiment of the invention illustrated in FIG. 3 replaces the feed resistors 112 and 113 of the line circuit in FIG. 1, with tip and ring active feed resistors 12 and 13. In order to realise all the benefits of the invention in a telephone facility as for example illustrated in FIG. 2, it preferable that any protection network, of function similar to the function of the protection network 100, not be provided.

Referring to FIG. 3, the active tip feed resistance 12 is connected in series between a tip terminal 2, which is also referred to as a line terminal, and coupling means, not shown, via an interface terminal 4, to provide a path of predetermined resistance for alternating current signals and for direct current. In the active tip feed resistance 12, a tip reference voltage divider is provided by resistors 36 and 37 connected in series between the line terminal 2 and the interface terminal 4, and which define a tip reference voltage tap 38. A first field effect transistor (FET) 31 with first source, drain and gate electrodes, and a second FET 32 with second source, drain and gate electrodes, are connected is series such that a source electrode of one is connected to a source electrode of the other, as shown, to provide a variable valving circuit 30. A tip passive resistance element 39 is connected in series between the second source electrode and is of a resistance corresponding to a predetermined fraction of the predetermined resistance. The FETs 31 and 32, and the resistance element 39 carry virtually all of the alternating and direct currents between the terminals 2 and 4. Series conductance of the FETs 31 and 32 is controlled by a tip valving control circuit which includes a differential amplifier circuit 35 having an inverting input connected to the tip reference voltage tap 38, a non-inverting input connected via a resistor 40 to the junction of the resistance element 39 and the second drain electrode, and an output being resistively connected via a resistor 33 to the first and second gate electrodes. The differential amplifier circuit 35 is operative to control the conductances of the first and second FETs 31 and 32 such that the active tip feed resistance 12 conducts with a resistance corresponding to the predetermined resistance under normal OFF HOOK operating conditions. The inverting input of the differential amplifier circuit 35 is protected by diodes 34, which however are somewhat isolated from the tip terminal 2 by the resistor 36 and hence never conduct disturbing currents to the power bus. The active tip feed resistance 12 also includes a tip threshold circuit which is operative in the event of an excess of voltage appearing at the tip terminal 2 to override the control of the differential amplifier circuit 35, to switch the variable valving circuit 30 to a very high resistance state. The tip threshold circuit includes first and second legs 21 and 22 each of which is provided by similar components which are similarly labelled in the leg 22 as diodes 23 and 26, a Zener diode 24, a resistor 25, and an N P N transistor 27, being connected as illustrated. The leg 21 is responsive to excessive voltages of positive polarity with respect to ground, and the leg 22 is responsive to excessive voltages of negative polarity with respect to a potential at the output of the differential amplifier circuit 35.

The active ring feed resistance 13 is connected in series between a ring terminal 3, which is also referred to as a line terminal, and the previously mentioned coupling means, via an interface terminal 5, to provide a path of the predetermined resistance for alternating current signals and for direct current. In the active ring feed resistance 13, a ring reference voltage divider is provided by resistors 66 and 67 connected in series between the line terminal 3 and the interface terminal 5, and which define a ring reference voltage tap 68. A third FET 61 with third source, drain and gate electrodes, and a fourth FET 62 with fourth source, drain and gate electrodes, are connected is series such that a source electrode of one is connected to a source electrode of the other, as shown, to provide a variable valving circuit 60. A ring passive resistance element 69 is connected in series between the fourth source electrode, and is of a resistance preferable close to the resistance value of the tip passive resistance element 39. The FETs 61 and 62, and the resistance element 69 carry virtually all of the alternating and direct currents between the terminals 3 and 5. Series conductance of the FETs 61 and 62 is controlled by a ring valving control circuit which includes a differential amplifier circuit 65 having an non-inverting input connected to the tip reference voltage tap 68, a non-inverting input connected to the junction of the resistance element 69 via a resistor 70 and the fourth drain electrode, and an output being resistively connected via a resistor 63 to the third and fourth gate electrodes. The differential amplifier circuit 65 is operative to control the conductances of the third and fourth FETs 61 and 62 such that the active ring feed resistance 13 conducts with a resistance corresponding to the predetermined resistance under normal OFF HOOK operating conditions. The inverting input of the differential amplifier circuit 65 is protected by diodes 64, which however are somewhat isolated from the ring terminal 3 by the resistor 66 and hence never conduct disturbing currents to the power bus. The active ring feed resistance 13 also includes a ring threshold circuit which is operative in the event of an excess of voltage appearing at the ring terminal 3 to override the control of the differential amplifier circuit 65, to switch the variable valving circuit 60 to a very high resistance state. The ring threshold circuit includes legs 51 and 52 which correspond in structure and operation to the previously mentioned legs 21 and 22 and are not further discussed.

Tip and ring voltage dividers 14 and 15 are provided by resistors 14a, 14b and 15a, 15b connected as shown across the active tip and ring feed resistors 12 and 13 to provide tip and ring voltage taps at terminals 6 and 7, which are normally connected across an input of the amplifier 160 in FIG. 1.

In this example the value of the predetermined resistance of each of the tip and ring active resistance elements is 100 ohms, and the values of the passive resistance elements 39 and 69 are within 1% of 50 ohms. Suitable FETs 31, 32, 61 and 62 are N channel 1000 volt breakdown devices with a standard industry code 3N100. One source of these FETs is Motorola Inc. at Schlumberger, Ill. However it is envisioned that in quantity production a custom integrated device will provide both the variable valving circuits 30 and 60. The diodes 24 may be provided for by 80 volt Zener diodes or by any convenient structure with somewhat equivalent operating characteristics. All of the remaining resistors shown may of the similar values of 100 kilohms, however the resistors defining the tip and ring voltage taps should be closely matched.

We claim:

1. A line interface circuit, for supplying energizing direct current from a power source via tip and ring leads of a two wire communications line connected with a telephone apparatus, and for coupling alternating current signals between the telephone line and an associated telephone facility, the line interface circuit comprising:

tip and ring terminals for connection to the tip and ring leads;
   power terminals for connection to the power source;
   coupling means being connected in series with the tip and ring terminals for providing paths for the energizing direct current and for the alternating current signals;
   an active tip feed means being connected in series between the tip terminal and the coupling means, and
   an active ring feed means being connected in series between the ring terminal and the coupling means;
   the active tip feed means and the active ring feed means each comprising:
   a line terminal connected at a respective one of the tip and ring terminals, and an interface terminal connected to the coupling means;
   passive and active resistance elements being connected in series between the line and interface terminals, the passive resistance element being of a resistance value corresponding to a predetermined fraction of the predetermined resistance;
   a reference voltage divider connected between the line and interface terminals and defining a reference voltage tap; and
   valving control means being responsive to a reference voltage at the reference voltage tap, for adjusting the resistance of the active resistance element to a value which in summation with the resistance of the passive resistance element provides the predetermined resistance, and being responsive to an occurrence of an excess of voltage at the reference voltage tap, for adjusting the resistance of the active resistance element toward infinity, whereby current flow via the active feed means is substantially shut OFF.

2. A line interface circuit as defined in claim 1 wherein the passive resistance element is connected to the interface terminal and the active resistance element is connected between the line terminal and the passive resistance element, and defines therewith a feed voltage tap.

3. A line interface circuit as defined in claim 2, wherein the active resistance element comprises a field effect transistor.

4. A line interface circuit as defined in claim 2, wherein the active resistance element comprises:
   first and second field effect transistors, the first field effect transistor having first source, drain and gate electrodes, and the second field effect transistor having second source, drain and gate electrodes, the first and second field effect transistors being connected is series such that a source electrode of one is connected to a source electrode of the other, each of the first and second gate electrodes being separately and resistively connected to a corresponding output of the valving control means.

5. A line interface circuit as defined in claim 2, wherein the valving control means comprises:
   a differential amplifier circuit being responsive to a voltage at the reference voltage tap for controlling the active resistance element such that a corresponding voltage appears at the feed voltage tap; and
   a threshold circuit including an output electrode being connected to the active resistance element, and an input connected to the line terminal and being responsive to said excess of voltage for switching the active resistance element OFF.

6. A line interface circuit as defined in claim 5, wherein the threshold circuit comprises:
   first and second legs each having an output electrode, one of the legs being operative in response to the excess of voltage being of a positive polarity and the other of the legs being operative in response to the excess of voltage being of a negative polarity; and
   wherein the active resistance element comprises:
   first and second field effect transistors, the first field effect transistor having first source, drain and gate electrodes, and the second field effect transistor having second source, drain and gate electrodes, the first and second field effect transistors being connected in series such that a source electrode of one is connected to a source electrode of the other, each of the first and second gate electrodes being separately and resistively connected to an output of the differential amplifier circuit and separately and directly connected to the output electrode of the corresponding leg of the threshold circuit.

7. A line interface circuit for supplying energizing direct current from a power source via tip and ring terminals for connection to a telephone apparatus via the tip and ring leads of a two wire communications line, and for coupling alternating current signals via a coupling means, between the telephone line and an associated telephone facility, the line interface circuit comprising:
an active tip feed resistance means and an active ring feed resistance means;
the active tip feed resistance means being connected in series between the tip terminal and the coupling means for providing a tip feed path having a predetermined resistance while the telephone apparatus is in an OFF HOOK state, and having a higher resistance in response to an excess of voltage at the tip terminal, the active tip feed means comprising:
a tip reference voltage divider connected between the line terminal and the coupling means and defining a tip reference voltage tap;
first and second field effect transistors, the first field effect transistor having first source, drain and gate electrodes, and the second field effect transistor having second source, drain and gate electrodes, the first and second field effect transistors being connected is series such that a source electrode of one is connected to a source electrode of the other;
a tip passive resistance element being connected in series with the second drain electrode and being of a resistance corresponding to a predetermined fraction of a predetermined resistance;
a tip valving control circuit including a differential amplifier circuit including an input connected to the tip reference voltage tap, an input connected to the second drain electrode, and an output being resistively connected to the first and second gate electrodes, the differential amplifier circuit being operative to control the conductance of the first and second FETs such that the active tip feed means conducts with a resistance corresponding to said predetermined resistance; and
a tip threshold circuit having first and second legs being operative in response to and throughout a duration of a negative or a positive excess voltage at the tip terminal, respectively, for rendering one or the other of the first and second FETs nonconductive;
the active ring feed resistance means being connected in series between the ring terminal and the coupling means for providing a ring feed path having a predetermined resistance while the telephone apparatus is in the OFF HOOK state, and having a higher resistance in response to an excess of voltage at the ring terminal, the active tip feed means comprising:
a ring reference voltage divider connected between the ring terminal and the coupling means and defining a ring reference voltage tap;
third and fourth field effect transistors, the third field effect transistor having third source, drain and gate electrodes, and the fourth field effect transistor having fourth source, drain and gate electrodes, the third and fourth field effect transistors being connected is series such that a source electrode of one is connected to a the source electrode of the other;
a ring passive resistance element being connected in series with the third drain electrode and being of a resistance corresponding to said predetermined fraction;
a ring valving control circuit including a differential amplifier circuit including an input connected to the ring reference voltage tap, an input connected to the third drain electrode, and an output being resistively connected via third and fourth resistors to the third and fourth gate electrodes, the differential amplifier circuit being operative to control the conductance of the third and fourth FETs such that the active tip feed means conducts with a resistance corresponding to said predetermined resistance; and
a ring threshold circuit having first and second legs being operative in response to and throughout a duration of a negative or a positive excess voltage at the ring terminal, respectively, for rendering one or the other of the third and fourth FETs nonconductive.

* * * * *

UNITED STATES PATENT AND TRADEMARK OFFICE
CERTIFICATE OF CORRECTION

PATENT NO. : 5,189,697

DATED : 23 February 1993

INVENTOR(S) : Tapan K. DAS; Oguz OZKAN; George S. FUNG

It is certified that error appears in the above-identified patent and that said Letters Patent is hereby corrected as shown below:

In Claim 1, at column 7, line 65, delete "the" and insert therefor --a--.

Signed and Sealed this

Sixteenth Day of November, 1993

Attest:

BRUCE LEHMAN

Attesting Officer     Commissioner of Patents and Trademarks